March 25, 1941.  F. G. VON HOORN  2,236,279
ELECTRIC TERMINAL DEVICE
Filed April 19, 1939
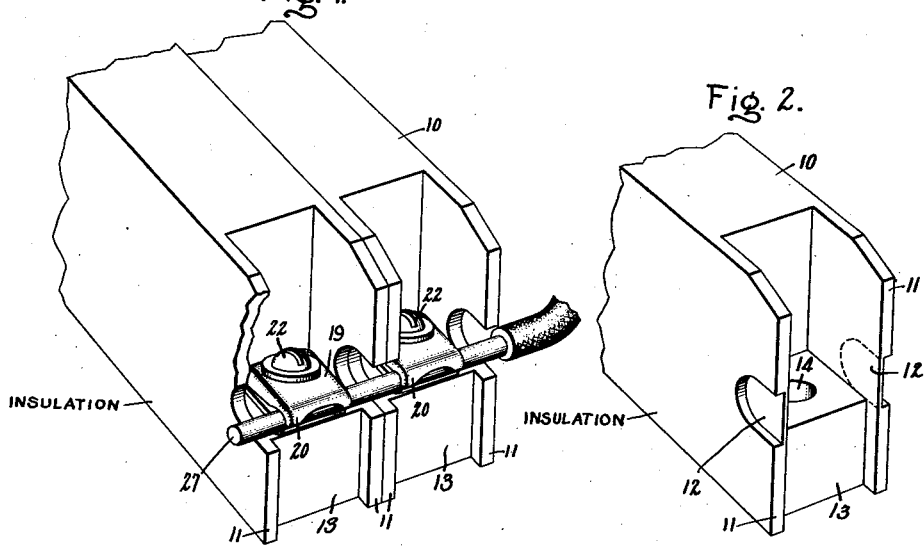
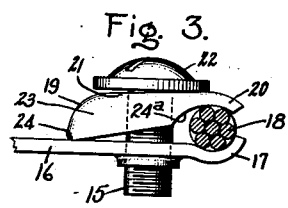
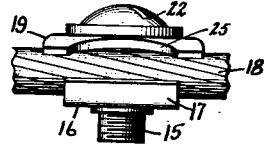
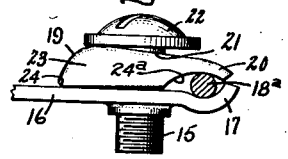
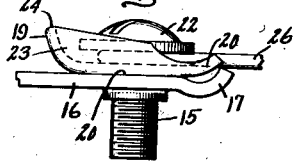
Inventor:
Fred G. von Hoorn,
by Harry E. Dunham
His Attorney.

Patented Mar. 25, 1941

2,236,279

UNITED STATES PATENT OFFICE 2,236,279

ELECTRIC TERMINAL DEVICE

Fred G. von Hoorn, Nichols, Conn., assignor to General Electric Company, a corporation of New York Application April 19, 1939, Serial No. 268,799

7 Claims. (Cl. 173—259)

My invention relates to electric terminal devices, more particularly to clamping type terminals, and has for an object the provision of an improved device of this character which will serve to secure a conductor in transverse or bus wiring and also, when reversed, in longitudinal or end wiring.

The terminal device of my invention is particularly adapted for facilitating the grouping and wiring of circuit breakers in residential installations. By merely reversing a single clamping element of the terminal device, transverse or longitudinal connection to a conductor may be made, thereby avoiding the use of new elements or devices when changing over from one type of wiring to another. In this manner, the ease and flexibility of securing conductors, either as transverse bus or as longitudinal end-connected wiring, is greatly enhanced.

Normally, a terminal device for securing the end of a conductor in longitudinal wiring requires a special cupped washer or dish-shaped member to confine the looped end of the conductor beneath suitable fastening means, such as a bolt or screw head. When transverse bus wiring is desired, the cupped washer must be discarded and replaced by a clamping member. According to my invention, I provide a single member which serves as this cupped washer, and is also reversible for use as a clamping element co-operating with a suitable terminal strip to secure a conductor in transverse or bus wiring.

The insulating barriers usually provided to insulate the terminals of circuit breakers, instead of consisting of solid walls, are in accordance with my invention provided with removable knock-out portions adjacent the terminal so that when transverse wiring is effected, the transverse conductor may pass through the openings so provided at either side of the terminal. Thus when it is desired to connect circuit breakers or other electrical equipment provided with terminal devices embodying my invention to a common feeder wire or bus, this may be done by mounting the circuit breakers so that the knock-out openings. in the barriers are in alignment, the common feeder wire passing through these openings. Connection is made by clamping each terminal to the wire, and since the polarity of terminals connected to a common bus is the same, the openings provided in the barrier walls by removal of the knock-outs are unobjectionable, insulation between terminals being unnecessary.

Further objects and advantages of my invention will become apparent from the following specification and for a more complete understanding of my invention, reference should be had to the accompanying drawing, in which Fig. 1 is a fragmentary perspective view of a pair of circuit breakers in side by side relation and provided with terminal devices embodying my invention shown clamped to a common transverse feeder wire; Fig. 2 is a fragmentary perspective view of a single circuit breaker provided with insulating and supporting structure for a terminal, and having a pair of spaced-apart barrier walls provided with knock-out portions shown in place; Fig. 3 is a side elevation of a terminal, clamping and securing a transverse conductor of relatively large size; Fig. 4 is a front elevation of the terminal and conductor shown in Fig. 3; Fig. 5 is a side elevation of a terminal similar to Fig. 3 but shown clamping and securing a transverse conductor of relatively small size; and Fig. 6 is a side elevation of a terminal having a clamping member embodying my invention, shown in a reverse or inverted position, securing the looped end of a longitudinal conductor.

Referring to the drawing, I have shown my invention in one form, as an electric terminal device for use on circuit breakers, although it may be used on other electrical equipment. The terminal device according to my invention is especially adapted to secure either a transversely running conductor, such as a feeder or bus wire, or the looped end of a longitudinal conductor which normally terminates at the terminal.

Referring to Fig. 2, a terminal portion 10 of an electrical device, as shown, a circuit breaker, comprises an insulating support for the connecting means of the terminal device. The terminal portion 10 preferably is made of some suitable insulating composition, such as hard rubber or a phenolic condensation product, and as shown is formed integrally with the enclosing walls of the circuit breaker. Spaced-apart barrier walls 11 provided with oppositely disposed knock-out portions 12 serve to insulate the connecting means from other terminals, circuit conductors and the like. A base block 13 is formed between the lower portions of the barrier walls 11 but integral therewith and is provided with an aperture 14 for loosely securing the end of suitable fastening means, such as the threaded screw 15, therein.

As seen in Fig. 3, the screw 15 preferably is threaded into an intermediate portion of a suitable terminal strip 16, the terminal strip being provided with an in-curved, transverse jaw 17 at its right end for holding a transverse conductor 18 therein. The terminal strip 16 is normally supported on the top of the insulating block 13, its left-hand end (indicated by broken lines) extending into the circuit breaker for connection therewith.

For securing and clamping the transverse conductor 18, a reversible dish-shaped clamping member 19 is provided having an in-curved, transverse jaw 20 at its right end which, as shown in Figs. 1, 3, 4 and 5, may be placed in clamping relation with the jaw 17 on the terminal strip 16. The clamping member 19 has a substantially flat portion 21 provided with a suitable aperture through which the screw 15 extends, a head 22 on the screw 15 being in abutting relation with the flat portion 21 for drawing the clamping member 19 toward the terminal strip 16.

For strengthening the clamping member 19, a peripheral wall or flange 23 is provided at its left-hand end and sides forming a dish-shaped body portion. This flange has a high portion 24 at the left end of the clamping member which serves as a pivot point on the terminal strip 16. As illustrated in Figs. 3 and 5, transverse conductors 18 and 18a of various diameters may be secured between the jaws 17 and 20 since substantial pivotal movement of the clamping member is possible because the peripheral wall 23 slopes or decreases in height from the high portion or pivot 24 toward the opposite end adjacent the jaw 20.

As shown, the jaw 20 preferably is formed by providing a pair of oppositely disposed curved notches 24a in the peripheral wall 23 at the sides of the clamping member 19 adjacent its right end. The extreme right end of the clamping member 19 is bent or curved slightly to complete the lip of the transverse jaw 20 and a notch 25 is cut longitudinally into this end to form an open-center portion on the jaw. The open-center jaw portion 25 is uniplanar with the inside surface of the flat portion 21 of the clamping member 19 and serves, when the clamping member is reversed or inverted relative to the terminal strip 16, to receive and secure a longitudinally directed conductor 26, as shown in Fig. 6, having its end looped about the screw 15 beneath the head 22 thereon.

When, as indicated in the foregoing, the clamping member 19 is utilized in longitudinal or end wiring, the peripheral wall 23 serves to confine the looped end of the longitudinally extending conductor 26 around the screw 15 and beneath its head 22 and to prevent it working out from beneath the screw head, as the head is drawn down. If desired, a common washer may be placed just beneath the head 22 of the screw 15 to provide a suitably large clamping head to facilitate the tightening of the screw against the conductor 26. Also, as seen in Fig. 6, the extreme right end of the jaw 17 on the terminal strip 16 assists in supporting the longitudinal conductor 26 just adjacent its point of entrance into the open-center jaw portion 25.

Referring now to Fig. 1, I have shown the preferred form of transverse wiring wherein adjacent circuit breakers are secured by clamping to a common wire 27. Obviously, with this construction there is no need for the special bus bar generally used and because the terminals of the circuit breakers clamp directly to the feeder wire, no main terminal and additional connecting wires are required. As explained hereinbefore, the knock-out portions 12 are removed from the adjacent barrier walls 11 and the feeder wire is directed through these openings, resulting in a compact and space-saving wiring job.

When longitudinal or end wiring to a single breaker is desired, the terminal shown in Fig. 6 is mounted in the support 13 shown in Fig. 2, the knock-portions 12 being left in the barrier walls 11 to afford the necessary insulation at the sides of the terminal.

Although I have shown a preferred form of terminal strip 16 and clamping member 10 provided with a fastening screw 15, it is obvious that modifications in these elements may be made without departing from the scope of my invention. For instance, a bolt or other fastening means may be provided in place of the screw 15, and other shapes may be given to the jaws 17 and 20, and, therefore, I do not wish to be limited to the particular form shown but contemplate by the appended claims to cover any such modifications as fall within the true spirit and scope of my invention.

What I claim as new and desire to secure by Letters Patent of the United States is:

1. An electric terminal device comprising a terminal strip having an in-curved transverse jaw, a clamping member having a complementally curved transverse jaw and an apertured dish-shaped body portion, said clamping member being reversible with respect to said terminal strip and arranged in one position to bear pivotally on said terminal strip to secure a substantially straight conductor between said jaws and in an inverted position to secure a looped conductor in said dish-shaped body portion, and fastening means for holding said clamping member in engagement with said terminal strip.

2. An electric terminal device comprising a terminal strip provided with a jaw, a clamping member provided with an open-center jaw, fastening means for holding said clamping member to said strip with said jaws in clamping relation to secure a substantially straight conductor therebetween, said clamping member being provided with a body portion having a flange extending toward said strip forming a pivot supported by said strip for the end of said clamping member opposite its jaw, additional flange means along two other sides of said clamping member, said clamping member being reversible relative to said strip with said body portion adjacent and said flange and said flange means projecting away from said strip for positioning and confining a conductor having a loop lying within said flange and between said flange means and around said fastening means and having a leading-in portion supported in said open-center jaw, said loop of said conductor being secured by said fastening means.

3. An electric terminal device comprising a terminal strip provided with a jaw, a clamping member provided with a substantially flat portion formed to provide an open-center jaw at one end and provided with a flange around its opposite end and sides increasing in height toward said opposite end, a screw for holding said clamping member to said strip with said jaws in clamping relation to secure therebetween a conductor running transversely of said strip and said member, a portion of said flange forming a pivot on said strip for the end of said clamping member opposite its jaw, said clamping member being reversible with said flat portion against said strip for securing a conductor having a loop about said screw and lying within said flange and having a leading-in portion supported in said open-center jaw.

4. A terminal device for securing a conductor comprising a terminal strip provided with a jaw at one end, a member of dished shape having a jaw at one end in clamping relation with said jaw on said strip for securing therebetween a conductor running transversely of said strip and said member, said strip supporting the other end of said member, a peripheral wall on said member having a high portion at said other end of said member opposite said jaw serving as a pivot about which said member is movable relative to said strip, said peripheral wall being sloped from said high portion thereof to a lesser height along the sides of said member for permitting a substantial pivotal movement of said member toward said strip, means including an axially movable post having a head portion in abutting movable post having a head portion in abutting relation with said member for drawing said clamping jaws together, said member when reversed relative to said strip then serving as a dished shaped confining means for a conductor running longitudinally therein and having an end looped around said post, a portion of said peripheral wall of said member confining said end of said conductor in position about said post when said head portion is drawn toward said conductor, said terminal member again serving as a support for said dished member.

5. A terminal device for securing a conductor comprising a terminal strip having a transverse jaw at one end of said strip, a member of dished shape having a transverse jaw at one end of said member in clamping relation with said jaw on said strip for receiving therebetween a conductor running transversely of said strip and said member, said strip supporting the other end of said member, a peripheral wall on said member having a high portion at said other end of said member opposite said jaw serving as a pivot about which said member is movable relative to said strip, said peripheral wall being sloped from said high portion thereof to a lesser height along the sides of said member for permitting a substantial pivotal movement of said member toward said strip, means including an axially movable post having a head portion in abutting relation with said member for drawing said clamping jaws together, said member when reversed or inverted relative to said strip then serving as a dished shaped confining means for a conductor running longitudinally therein having an end looped around said post, a portion of said peripheral walls of said member confining said end of said conductor in position about said post when said head portion is drawn toward said conductor, said terminal member again serving as a support for said dished member, and guide means for said longitudinally running conductor comprising a recess extending from said end of said member adjacent said jaw along a portion of the longitudinal axis of said member.

6. A terminal device for securing a conductor comprising a relatively fixed terminal strip having a threaded aperture in an intermediate portion thereof and a transverse jaw at one end of said strip, a member of dished shape having an aperture in an intermediate portion thereof and having a transverse jaw at one end of said member in clamping relation with said jaw on said strip for receiving therebetween a conductor running transversely of said strip and said member, a peripheral wall on said member having a high portion at the end of said member opposite said jaw serving as a pivot about which said member is movable on and relative to said strip, said peripheral wall being sloped to a lesser height along the sides of said member for permitting substantial pivotal movement of said member, a screw having a head in abutting relation with said member and having a threaded body portion extending through said aperture in said member and threaded into said thread aperture in said terminal member for drawing said clamping jaws together, said member when reversed or inverted relative to said strip then serving as a dished shaped washer for a conductor running longitudinally therein and having an end looped around said screw, a portion of said peripheral walls confining said end of said conductor in position about said screw when said screw head is drawn down thereon, said terminal member supporting said dished member thereunderneath.

7. An electric terminal device comprising a terminal strip provided with an incurved, transverse jaw, a clamping member provided with a substantially flat portion having a peripheral wall around its one end and sides decreasing in height from said end, said wall being provided with oppositely disposed notches adjacent the opposite end of said clamping member to form an incurved, transverse jaw, said opposite end of said clamping member forming a receiving recess extending longitudinally thereof having its bottom substantially uniplanar with said flat portion of said clamping member, a screw threaded into said strip having a head for holding said strip and said clamping member in clamping relation to secure a conductor between said transverse jaws, said peripheral wall serving as a pivot on said strip for the end of said clamping member opposite said jaw portions, said clamping member being reversible relative to said strip.

FRED G. von HOORN.